United States Patent [19]

Nagayasu

[11] Patent Number: 4,795,603

[45] Date of Patent: Jan. 3, 1989

[54] METHOD FOR PRODUCING COMPOSITE MATERIAL OF PLASTIC AND RUBBER

[76] Inventor: Nobuhiko Nagayasu, No. 1527, Orisaki, Oaza, Nagasu-machi, Tamana-gun, Kumamoto-ken, Japan

[21] Appl. No.: 105,743

[22] Filed: Oct. 8, 1987

[30] Foreign Application Priority Data

Oct. 16, 1986 [JP] Japan ................................ 61-246247

[51] Int. Cl.$^4$ ............................................. B29C 45/00
[52] U.S. Cl. ................................ 264/328.18; 264/37; 264/DIG. 69
[58] Field of Search ............. 264/328.18, 37, DIG. 69

[56] References Cited

U.S. PATENT DOCUMENTS

| | | | |
|---|---|---|---|
| 3,991,005 | 11/1976 | Wallace | 264/37 |
| 4,379,525 | 4/1983 | Nowicki et al. | 264/37 |
| 4,447,479 | 5/1984 | Harrison et al. | 264/68 |

FOREIGN PATENT DOCUMENTS 48-18569  6/1973  Japan .

*Primary Examiner*—Jan H. Silbaugh
*Assistant Examiner*—Allan R. Kuhns
*Attorney, Agent, or Firm*—Armstrong, Nikaido, Marmelstein & Kubovcik

[57] ABSTRACT

Rubber waste fine particles in the form of fine particles obtained by crushing rubber waste and plastics waste rugged rough particles formed by crushing molded polyethylene or polypropylene waste are mixed to obtain a raw material mixture. When the mixture is heated, only the plastics waste rugged rough particles are melted, and the resulting material is pressed and injected to mold it into the desired shape. The thus obtained composite material exhibits an ebony-like configuration, and is light in weight, high in hardness, excellent in toughness, and rich in water resistance and weather resistance.

1 Claim, No Drawings

METHOD FOR PRODUCING COMPOSITE MATERIAL OF PLASTIC AND RUBBER

BACKGROUND OF THE INVENTION

1. Field of the Invention

The present invention relates to a composite material of plastics and rubber utilizing plastics waste and rubber waste.

2. Description of the Prior Art

In the past, a material has been known in which 30 to 70 parts of vulcanized rubber crushed material is mixed with 70 to 30 parts of heated and molten polyolefin system amorphous polymer to solidify it into a pellet or a molded article. (See Japanese Patent Publication No. 18,569/1973).

However, this material is rich in resiliency and is suitable for the shock resistance but it is difficult to obtain a material having high hardness and toughness equal to any ebony in the above-described ratio. In addition, if rubber particles and plastics pellets are directly combined at normal temperature, there occurs a phenomenon of the rubber particles and plastics pellets not being evenly combined but only the plastics pellets are gathered due to the surface slide phenomenon of the plastics pellets, thus making it difficult to provide uniform mixing.

SUMMARY OF THE INVENTION

An object of the present invention is to provide a composite material of plastics and rubber whose surface nature is analogous to wood (ebony) and rubber, which utilizes plastics waste and rubber waste, and which has high hardness, is rich in toughness, and has water resistance and weather resistance.

A further object of the invention is to provide a method for producing a composite material which can obtain such composite material, in which method a surface slide phenomenon at the time of mixing of plastics particles and rubber particles is eliminated to provide uniform mixed raw material, and in which the plastics melts and the rubber particles are readily made to be uniform.

For achieving the aforementioned objects, a method for producing a composite material of plastics and rubber according to the present invention comprises mixing rubber waste particles and plastics waste rugged rough particles obtained by crushing molded polyethylene or polypropylene waste, heating said mixture to melt only said rough particles, pressing and injecting the same to mold it.

The aforesaid rubber waste particles may be obtained by crushing rubber waste into particles. On the other hand, polyethylene or polypropylene waste molded and used up for containers or the like is crushed to obtain plastics waste rough particles whose surface is in the rugged shape. Effective plastics waste comprises a waste of polyethylene or polypropylene resin which is a thermoplastic resin whose specific gravity is close to that of rubber. When said fine particles and said rough particles are mixed, both the particles are uniformly combined because of absence of the surface slide therebetween to form a mixture of raw material formed from both the particles. When this material is charged into a raw material supply hopper of an injection molding machine, the material moves into the holding machine while maintaining its uniformed mixed state along the inclined surface of the hopper. Within the injection molding machine, the material is heated up to or above a melting point of the rough particles but the fine particles will not be melted but they are pressed in that state and injected into a mold form from a nozzle having a diameter of approximately 2 mm, and then removed from the mold to provide a product.

Thereby, there is obtained a composite material in the form of an ebony which is light in weight, high in hardness, excellent in toughness and rich in water resistance and weather resistance.

DESCRIPTION OF THE PREFERRED EMBODIMENTS

Synthetic rubber waste such as waste tires of bicycles or industrial rubber rubbish are cut or crushed and further pulverized and then subjected to sieving of 30 to 100 meshes. The sieved fine particles are stored in a storage tank. On the other hand, molded polyethylene or polypropylene waste such as clamp covers, insulating guards or poly-tubes (not polyvinyl chloride tubes) disposed every fixed period for increasing the safety of power equipment, used-up piled beers or various beverage containers, or agricultural and fishery containers are crushed by a crusher, and resulting material is subjected to sieving of 3 to 5 mm and stored in a storage tank. The rough particles in the size of 3 to 5 mm are rugged and their surfaces are not smooth. 30 to 10 weight % of the sieved rubber fine particles and 70 to 90 weight % of the sieved poly rough particles are combined into a 100% material, but preferably the fine particles and the rough particles are set to approximately 25 weight % and approximately 75 weight % (total 100%), respectively. If the rough particles are less than 70 weight % and the fine particles are above 30 weight %, the expected hardness (equal to the ebony) cannot be obtained, and if the rough particles are above 90% and the fine particles are less than 10%, the surface nature and toughness may not reach the intended object (surface nature and toughness equal to the ebony), as found from experiments. When the rough particles and fine particles combined in the ratio as described above are mixed stirred, they are mixed evenly. Even if the resulting material is charged into a raw material supply hopper of an injection molding machine, the slide will not occur between the rough particles and the fine particles because the former are in the rugged shape. Furthermore, the phenomenon can be prevented in which the rough particles slide along the inner surface of the metal hopper to leviate the fine particles and only the rough particles are moved into the injection molding machine. Thus, both the fine and rough particles are supplied from the hopper into the injection molding machine, while maintaining the even ratio. The nozzle of the injection molding machine has the temperature of 135° to 130° C. at the end, 123° to 120° C. at the middle, and 105° to 100° C. at the rear, and at these temperatures, only the rough particles are melted and the fine rubber particles are not melted and evenly suspended within the melts. The material injected under pressure by the nozzle is filled into a straight-grained plate-like mold and cooled to be molded into a plate-shape, and removed from the mold to form any ebony-like material (which exhibits black caused by carbon black in the rubber waste). This material is used for architectural materials such as floor plates, transoms, paper sliding doors, frameworks, flower bases, etc., matting for stores, factories, etc., tiles, drainboards, pallets, fixed boxes, packing material, U-shaped grooves, roofing, roofing tiles, wall fences, screens, etc., and is utilized for gathering-place for fish, netting, floor material for cultivating seaweed, cultivating cages for shell fish, etc., then barnacles and seaweeds are adhered to the surfaces of the rubber fine particles.

As a specific embodiment, 25 weight % of rubber waste fine particles of 30 meshes obtained by crushing waste tires of SBR (synthetic rubber made by emulsion polymerization of styrene and butadiene) and 75 weight % of plastics waste rough particles of the size from 3 to 4 mm obtained by crushing polypropylene waste are stirred and mixed, said mixture is heated to an injection mold temperature 180° C. (nozzle) and injection-molded to produce a treadle. When the configuration of this treadle was subjected to scanning electron microscope to observe that rubber in the form of particles in order of 100μ is mixed over the principal material of polypropylene, and in a particle field portion, numberless protrusions are formed on the particles surface and bridged over the principal material of polypropylene.

Further, the treadle was subjected to impact test in a low temperature zone to obtain the results as shown in the following table. This test was conducted on five specimens every temperature. It has been confirmed that this material is high in impact resistance at a low temperature and is optimum also as a material for pallets used in freezing warehouses and the like.

| Test Temp. (°C.) | RESULTS OF IMPACT TEST Impact Value (kgf cm/cm$^2$) | | | | | |
|---|---|---|---|---|---|---|
| | 1 | 2 | 3 | 4 | 5 | Ave. value |
| 0 | 24.8 | 22.9 | 20.1 | 20.6 | 18.7 | 21.4 |
| −10 | 18.6 | 12.2 | 9.3 | 20.1 | 15.4 | 15.1 |
| −20 | 12.2 | 16.0 | 17.9 | 17.9 | 14.2 | 15.6 |
| −30 | 13.3 | 11.0 | 7.5 | 5.4 | 9.3 | 9.3 |
| −40 | 9.8 | 11.0 | 7.6 | 6.4 | 9.3 | 8.8 |
| −50 | 9.3 | 9.3 | 9.3 | 9.8 | 9.8 | 9.5 |
| −60 | 8.6 | 8.1 | 8.1 | 9.3 | 6.4 | 8.1 |
| −70 | 8.5 | 9.7 | 8.0 | 7.5 | 9.2 | 8.6 |
| −80 | 7.5 | 9.2 | 11.4 | 7.5 | 6.8 | 8.5 |

What is claimed is:

1. A method for producing a composite material of plastics and rubber, the method comprising the steps of mixing rubber waste fine particles and rugged rough particles of plastics waste which have a grain size within the range of 3 to 5 mm and which are obtained by crushing molded polyethylene or polypropylene waste, said fine particles and rugged rough particles being uniformly combined because of absence of surface slide therebetween, then heating said mixture to melt only said rough particles, pressing and injecting the mixture to mold it, said rubber waste fine particles being in the range of 30 to 10 weight %, and said plastics waste rugged rough particles being in the range of 70 to 90 weight %.

* * * * *